United States Patent [19]

Yamazaki et al.

[11] Patent Number: 5,481,406
[45] Date of Patent: Jan. 2, 1996

[54] MECHANISM FOR WATERPROOFING OPERATION MEMBER OF INTERCHANGEABLE LENS BARREL

[75] Inventors: Satoshi Yamazaki, Tokyo; Toru Takayama, Kawasaki; Kunihiro Fukino, Fujisawa; Yoshiro Kodaka, Kawasaki; Hitoshi Imanari, Yokohama, all of Japan

[73] Assignee: Nikon Corporation, Tokyo, Japan

[21] Appl. No.: 136,256

[22] Filed: Oct. 15, 1993

[30] Foreign Application Priority Data

Nov. 13, 1992 [JP] Japan ................... 4-084683 U

[51] Int. Cl.⁶ .................................................. G03B 17/08
[52] U.S. Cl. ........................................... 359/694; 354/64
[58] Field of Search ........................... 359/694; 354/64, 354/288, 295

[56] References Cited

U.S. PATENT DOCUMENTS 4,666,274  5/1987  Maeno ......................... 354/64
5,066,965  11/1991  Tanaka ........................ 354/64
5,325,139  6/1994  Matsumoto .................. 354/64

*Primary Examiner*—Georgia Y. Epps
*Assistant Examiner*—Ricky Mack

[57] ABSTRACT

A waterproof operation mechanism of an interchangeable lens barrel having an operation member which is rotatably set around a periphery of the interchangeable lens barrel. A button engages with the operation member such that the button penetrates the operation member and protrudes outward from the operation member. The button functions to fix the operation member at a predetermined rotation position and to release the operation member from the predetermined rotation position. The interchangeable lens barrel includes a knurled part around its periphery, the knurled part being made of an elastic material and having a protruding portion integrally formed therewith to cover the button. Further, the operation member includes a fitting groove on a periphery of the operation member to prevent the knurled part from being displaced in a direction of an optical axis of the lens barrel.

8 Claims, 2 Drawing Sheets

MECHANISM FOR WATERPROOFING OPERATION MEMBER OF INTERCHANGEABLE LENS BARREL

BACKGROUND OF THE INVENTION

1. Field of the Invention

The present invention relates to a mechanism for waterproofing an operation member of an interchangeable lens barrel.

2. Background of the Invention

Generally, a switching operation ring, for example, for switching an auto-focussing mode, which is one of the operation members used in an interchangeable lens barrel, has a plurality of switching positions. In order not to easily come off the respective switching positions, the ring is fixed by an engaging member, which is loosened by pushing a disengagement button when the positions are switched.

FIG. 4 shows a typical example of such an operation member, in which a sectional view of the major portions of a switching operation ring are illustrated. A switching operation ring 53 is set between stopper members 51 and 52 so as not to shift in the direction of the optical axis, and is fit around the peripheral surfaces of the stopper member 51, which is a stopper cylinder so as to rotate around the optical axis. The switching operation ring 53 has a knurled part (indicated by a two-dot chain line in the figure) around its pheripheral surface except along an arc having a certain central angle, where an opening 53a is formed, as shown in the figure, and a switching button 54 is provided through the opening 53a.

The bottom of the switching button 54 is engaged with an end of a rotation stopper blade spring 55 for prohibiting rotation. The other end of the rotation stopper blade spring 55, which is arranged in the longitudinal direction along the inner diameter of the switching operation ring 53, is fixed to the switching operation ring 53 by a screw (not shown). And a protruding portion 55a is formed at the end of the rotation stopper blade spring 55.

In this constitution, in order to rotate the switching operation ring 53, the switching button 54 is pushed, thereby disengaging the protruding portion 55a of the rotation stopper blade spring 55 from a groove 51a formed in the stopper member 51.

In the above-mentioned prior art, a clearance is provided the switching button 54 and the brim of an opening 53a of the switching operation ring 53 so that the switching button can smoothly move. Accordingly, if a waterdrop, such as a raindrop splashes over the clearance, as shown by the arrow A, water enters inward through the clearance and damages machine parts and electrical components.

SUMMARY OF THE INVENTION

An object of the present invention, which was made in consideration of the above-mentioned problem, is to provide a waterproofing mechanism for effectively waterproofing the vicinity of an operation member of an interchangeable lens barrel.

In order to achieve the above object, the waterproofing mechanism according to the present invention waterproofs an operation member of an interchangeable lens barrel comprising said operation member which is rotatably set around the periphery of an interchangeable lens barrel and is provided with a knurled part around its outer surface; and a button which engages with said operation member such that the button penetrates the operation member and protrudes outward from it, and which is used to fit the operation member to as well as to disengage the same from certain positions. Said knurled part is made of an elastic material, and has a protruding portion for covering said button formed at a position in said knurled part integrally therewith.

It is preferable to form convex portions in one of said knurled part and said operation member and corresponding recess portions in the other for the engagement of said convex portions with said recess portions to facilitate positioning during the assembly.

With the above-mentioned constitution, since the clearance between the button and the brim of the opening is not exposed to a waterdrop but protected against it, the vicinity of the operation member is effectively waterproofed.

DETAILED DESCRIPTION OF THE PREFERRED EMBODIMENTS

Figure 1:
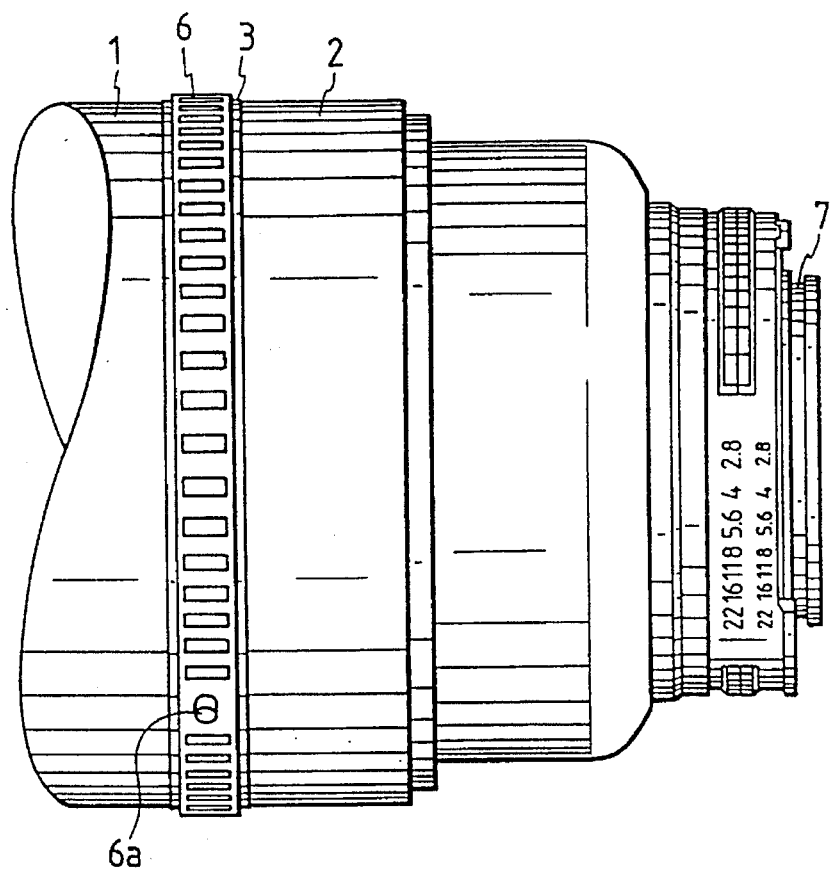
FIG. 1 shows the external appearance of an interchangeable lens barrel to which the present invention is applied.

FIG. 1 shows the external appearance of an embodiment of in interchangeable lens barrel according to the present invention, wherein only the rear half of the interchangeable lens barrel, including the waterproofing mechanism according to the present invention, is illustrated. Stopper members 1 and 2 are united with each other, and the stopper member 2 is further united with a mounting member 7 which is mounted to the camera body. The peripheral surface of a switching operation ring 3 is covered with a knurled rubber ring 6, in a part of which a protruding portion 6a is formed.

Figure 2:
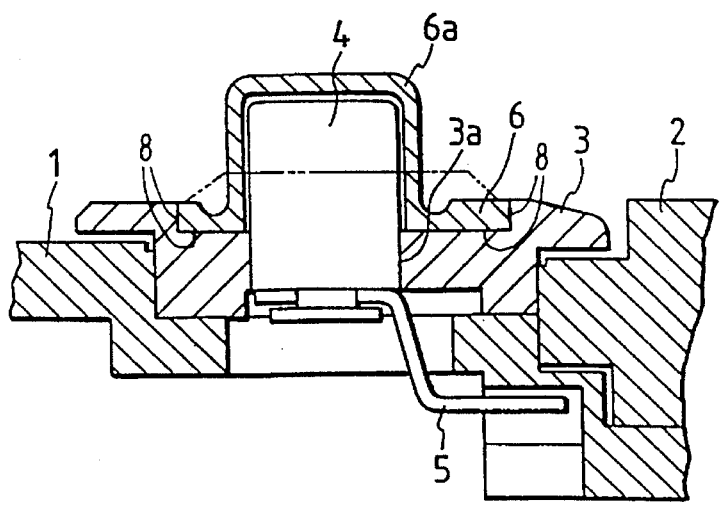
FIG. 2 is a cross-sectional view showing the major components of the first embodiment according to the present invention.

FIG. 2 is a cross-sectional view showing the major components of the above first embodiment. The protruding portion 6a is formed integrally with the knurled rubber ring 6 so as to fit a shape of the switching button 4. The knurled rubber ring 6 is fixed to the switching operation ring 3 with an adhesive. The switching operation ring 3 includes a fitting groove formed by surfaces 8 on a periphery of the switching operation ring 3. The knurled rubber ring 6 fits into the fitting groove 8 such that the knurled rubber ring 6 is prevented from being displaced in a direction of the optical axis of the interchangeable lens barrel.

Figure 4:
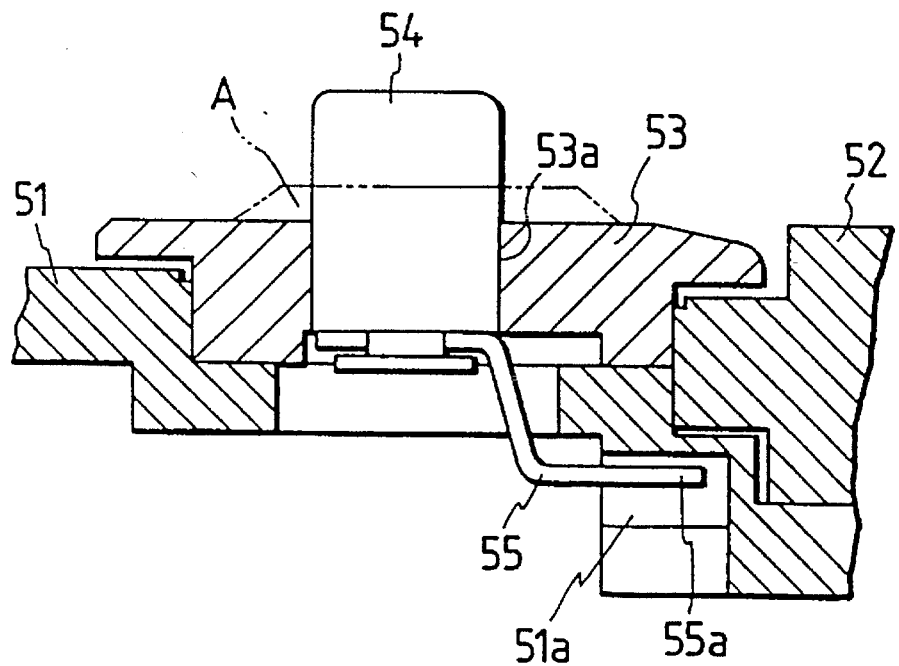
FIG. 4 is a cross-sectional view showing part of a conventional operation member and the vicinity thereof in an interchangeable lens barrel.

The rest of the constitution is the same as the conventional example shown in FIG. 4, and description thereof is not repeated.

In this constitution, since the clearance between the brim of the opening 3a and the switching button 4 is covered with the knurled rubber ring and is not exposed to the outside, a waterdrop splashing over the switching operation ring 3 does not enter inwards. Further, since the rubber ring 6 is elastic, when the protruding part 6a of the knurled rubber ring 6 is pushed the switching button 4 contained in it can be pushed too.

Figure 3:
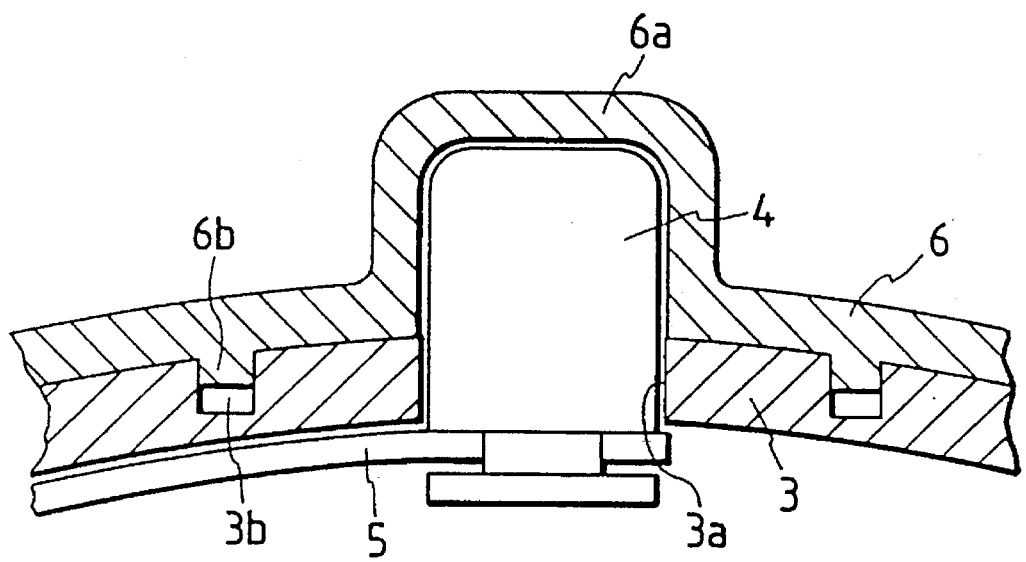
FIG. 3 is a cross-sectional view showing the major components of the second embodiment according to the present invention.

FIG. 3 is a cross-sectional view showing the major components of the second embodiment according to the present invention. The switching operation ring 3 has recesses 3b in the vicinity of the switching button 4 set in the switching operation ring 3. The knurled rubber ring 6 has projections 6b corresponding to said recesses 3b. The knurled rubber ring 6 is fixed to the switching operation ring 3 with an adhesive. The rest of the constitution is the same as the first embodiment, and description thereof is not repeated here.

According to the second embodiment, positioning during assembly is facilitated, that is, the facility of assembly can be improved. As attachment of the knurled rubber ring 6 to the switching operation ring 3 is further ensured, durability of rubber is improved. In addition, the knurled rubber ring 6 can be prevented from slipping over the switching operation ring 3 while operated.

Incidentally, though in the above respective embodiments the knurled rubber ring 6 is fixed to the switching operation ring 3 by an adhesive, fixation can be executed without using an adhesive. In this case, the inner diameter of the knurled rubber ring 6 is made a little smaller than the outer diameter of the switching operation ring 3 so that the stretched rubber of the knurled rubber ring set around the switching operation ring tightens therearound with its elasticity.

And though the knurled ring 6 is made of rubber in the above embodiments, the material is not limited to rubber. Any proper moldable elastic material can be employed appropriately.

Further, though in the second embodiment the recesses are formed in the switching operation ring 3 while the projections are formed in the knurled rubber ring 6a, the projections may be formed in the switching operation ring 3. In this case, the recesses are formed in the knurled rubber ring 6a.

Note that, though the present invention was described with reference to the embodiments in which the present invention is applied to the switching operation ring 3, the present invention can be applied to any parts of the operation member of the interchangeable lens barrel.

According to the present invention, a waterdrop such as a raindrop splashing over the vicinity of the switching button can be prevented from entering inward and damaging the machine parts and electrical components. Moreover, said waterproofing elect can be obtained without raising the cost, because the waterproofing mechanism is formed integrally with the knurled part.

In addition, as the switching button is entirely covered with the elastic material, the operation of pushing the button is good to the touch. Besides, the button is not slippery because of the elastic material of the knurled part. Therefore, the facility of operation of the switching operation ring is improved. Further, the external appearance is neat.

Furthermore, as the projections formed in one of the knurled part and the switching operation member are engaged with the corresponding recesses formed in the other, positioning during assembly is facilitated, that is, the facility of assembly can be improved. As attachment of the knurled portion to the switching operation member is further ensured, durability of the elastic material of which the knurled part is made is improved. In addition, the knurled part can be prevented from slipping over the switching operation member during operation.

What is claimed is:

1. A switching mechanism of an interchangeable lens barrel, comprising:

an operation member rotatably set around a periphery of the interchangeable lens barrel, said operation member having a knurled part around a periphery of the operation member; and a button which engages with said operation member such that the button penetrates said operation member and protrudes outward from said operation member, the button functioning to fix the operation member to a predetermined rotation position and to release the operation member from the fixed rotation position, wherein said knurled part comprises an elastic material, said knurled part having a protruding portion integrally formed therewith to cover said button, and said operation member having a a fitting groove on a periphery of said operation member to prevent the knurled part from being displaced in a direction of an optical axis of the interchangeable lens barrel.

2. A switching mechanism of an interchangeable lens barrel according to claim 1, wherein a projection is formed on one of said knurled part and said fitting groove, and the projection is engaged with a recess formed on the other of said knurled part and said fitting groove.

3. A switching mechanism of an interchangeable lens barrel according to claim 1, wherein said knurled part is made of rubber.

4. A switching mechanism of an interchangeable lens barrel according to claim 1, wherein said knurled part is fixed to said operation member with an adhesive.

5. A waterproof operation mechanism of an interchangeable lens barrel, comprising:

an operation member rotatably set around a periphery of the interchangeable lens barrel, the operation member having a fitting groove on a periphery of the operation member;

a button which engages with said operation member such that the button penetrates said operation member and protrudes outward from the operation member, the button functioning to fix the operation member to a predetermined rotation position and to release the operation member from the fixed rotation position; and a cover member made of an elastic material which is provided in said fitting groove of said operation member and which has a protruding portion integrally formed therewith to cover said button.

6. A waterproof operation mechanism of an interchangeable lens barrel according to claim 5, wherein a projection is formed on one of said cover member and said fitting groove, and the projection is engaged with a recess formed on the other of said cover member and said fitting groove.

7. A waterproof operation mechanism of an interchangeable lens barrel according to claim 5, wherein the cover member is made of rubber.

8. A waterproof operation mechanism of an interchangeable lens barrel according to claim 5, wherein said cover member is fixed to said operation member with an adhesive.

\* \* \* \* \*